(12) United States Patent
Chang et al.

(10) Patent No.: US 9,390,500 B1
(45) Date of Patent: Jul. 12, 2016

(54) POINTING FINGER DETECTION

(71) Applicant: Amazon Technologies, Inc., Seattle, WA (US)

(72) Inventors: Samuel Henry Chang, San Jose, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 13/830,564

(22) Filed: Mar. 14, 2013

(51) Int. Cl.
*G06K 9/00* (2006.01)
*G06T 7/00* (2006.01)

(52) U.S. Cl.
CPC ..................... *G06T 7/004* (2013.01)

(58) Field of Classification Search
None
See application file for complete search history.

(56) References Cited

U.S. PATENT DOCUMENTS

| | | | |
|---|---|---|---|
| 6,147,678 A * | 11/2000 | Kumar et al. | ................. 345/158 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2009/0175505 A1 * | 7/2009 | Muquit | .............. G06K 9/00006 382/115 |
| 2011/0268365 A1 * | 11/2011 | Lou et al. | ....................... 382/224 |
| 2012/0113241 A1 * | 5/2012 | Sundaresan et al. | ............ 348/77 |
| 2012/0223885 A1 | 9/2012 | Perez | |
| 2014/0240466 A1 * | 8/2014 | Holz | ....................... G06T 7/004 348/47 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Bhavesh Mehta
*Assistant Examiner* — Oneal R Mistry
(74) *Attorney, Agent, or Firm* — Lee & Hayes, PLLC

(57) ABSTRACT

A number of images of an environment may be obtained over time by a number of sensors. The data obtained by the sensors may be used to generate contours of objects in the environment. In some cases, hands with pointing fingers in the environment may be identified based on the contours of the objects in the environment. In particular, contours having a palm segment and a pointing finger segment may be identified as hands with pointing fingers. In an implementation, 1-dimensional curvature and distance information may be used to identify contours having a palm segment and a pointing finger segment.

15 Claims, 8 Drawing Sheets

POINTING FINGER DETECTION

BACKGROUND

User interfaces have traditionally relied on input devices such as keyboards, which require physical manipulation by a user. For instance, traditional human-to-computer interfaces are based on some form of physical touch, such as depressing keys on a computer keyboard, moving a mouse and clicking a button, moving a joystick, tapping a touch screen, and so forth. This physical type of human-to-computer interface is reliable and precise.

Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

One challenge with recognizing hand gestures is to first recognize that the object in the environment is a hand. Recognizing a hand is more difficult than other objects because the hand is complex with many independently moveable parts that may be observed as infinitely varying shapes, forms, and orientations.

Traditional feature-based shape matching approaches have been developed for target recognition and classification. Such approaches are neither flexible enough to model multiple appearances of a hand nor accurate enough to match a model to a target with small degrees of visual differences.

Accordingly, there is a need to improve ways to recognize hands to facilitate more accurate gesture detection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
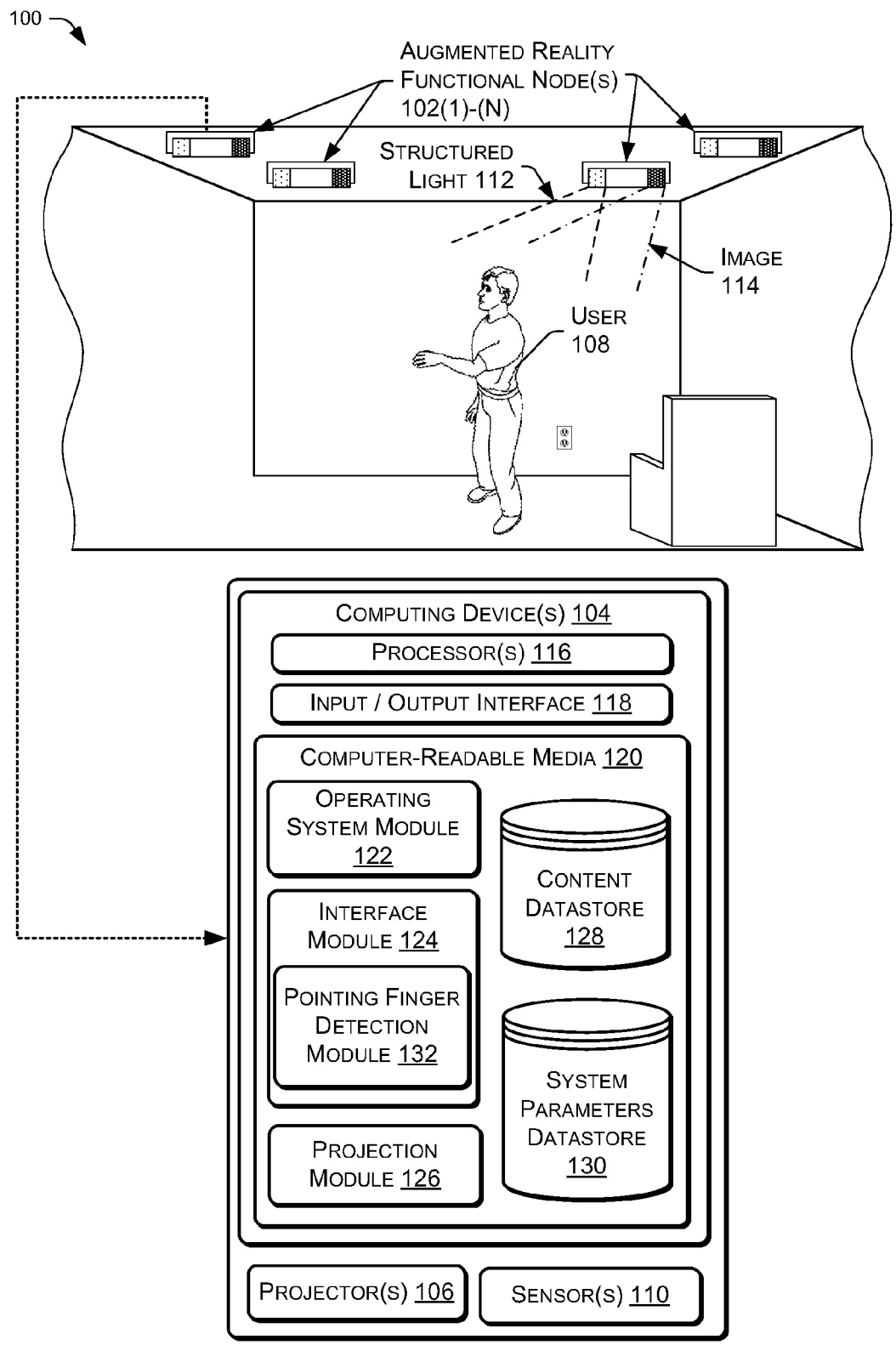
FIG. 1 illustrates an environment that includes an augmented reality functional node (ARFN) and a user that may interact with the ARFN using hand gestures.

Described herein are systems and techniques for detecting a hand with a pointing finger. Detecting hands is non-trivial, due to the complexity of modeling hands in motion. The appearances of a hand vary widely because the hand is not a rigid object, but has many independent digits and moving parts. Even hands with pointing fingers can vary in their appearance depending on which finger is being used to point and the orientation of the hand that includes the pointing finger. The techniques described below utilize contours of surfaces in an environment to detect a hand with a pointing finger.

For purposes of continuing discussion, a pointing finger may refer to a finger that is at least partially extended from a palm segment of a hand. The pointing finger may include any digit on a hand, such as an index finger, a middle finger, a ring finger, a pinkie finger, and a thumb. In some cases, the digits of the hand other than the pointing finger may not be extended from the palm or may be minimally extended. In one implementation, at least a portion of the digits of the hand other than the pointing finger may be curled toward the palm. In an illustrative example, a hand with a pointing finger may resemble the gesture made to select an item on a touch screen or to push a button to call an elevator. In particular situations, a hand may include multiple pointing fingers. For example, an index finger and a middle finger may be pressed together and used to make a pointing gesture.

In an implementation, data associated with the environment is obtained over time by one or more sensors located in the environment. For example, cameras located in the environment may capture images of the environment. In some cases, the images may include 2-dimensional (2D) images. Additionally, depth information obtained from sensors in the environment may be used to generate 3-dimensional (3D) images that correspond to the 2D images. The data obtained by the sensors may be used to generate contours of objects in the environment, such as contours of hands with pointing fingers.

In a particular implementation, the contours of objects in the environment are mapped onto a 1-dimensional (1D) curvature map by translating points along the contour into values on the curvature map. The distance between any two neighbor points are then mapped around the contours onto a 1D distance map. The curvature map and the distance map may be used to generate characteristics points of the contour, such as peak points and valley points of the contour. These characteristic points may then be used to determine whether particular contours include a palm segment of a hand and a pointing finger segment of the hand.

In an illustrative implementation, the palm segment may be identified according to a dimension of a geometric shape (e.g., a diameter of a circle, a radius of a circle, a circumference of a circle) fitted within a particular contour. For example, when the diameter of a circle fitted within the particular contour is included in a predetermined range, the contour may be designated as including a palm segment. Further, a pointing finger segment may be identified according to a distance between a peak point of the contour and the center of the fitted circle. When the distance between the peak point of the contour and the center of the fitted circle is included in a predetermined range, the contour may be designated as including a pointing finger segment. In situations where a contour includes both a palm segment and a pointing finger segment, the contour may be designated as being associated with a hand having a pointing finger.

Various types of cameras and sensors may be used to capture images representing the environment and objects within the environment. In some instances, the described techniques may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment 100 illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user 108 within the environment 100 may request that the ARFN 102 project a particular electronic book that the user 108 wishes to read. In response, the ARFN 102 may project the book onto a projection surface within the environment 100. In another example, the user 108 may request that the ARFN 102 project a particular movie or show that the user 108 wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, a telephone keypad, or any other type of UI. In some cases, the ARFN 102 may project the UI onto a display object in the environment 100, such as a hand of the user 108.

As discussed in further detail below, the ARFN 102 may include one or more sensor(s) 110 that may obtain data from the environment 100. In some implementations, the sensors 110 may include cameras (e.g., motion and/or still cameras), audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. In a particular implementation, the sensors 110 may include cameras that capture images of the illustrated user 108 providing input to the ARFN 102, such as by operating a projected UI, and in response, the ARFN 102 may provide feedback to the user 108 and/or may cause performance of actions corresponding to the selection by the user 108. For instance, when the ARFN 102 projects a remote control, the ARFN 102 may provide feedback to the user 108 indicating which button(s) a user is in position to select, may identify a particular selection of the user 108 (e.g., a selection to power on the television) and, in response, may operate the television according to the identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user 108 without reference to a UI projected within the environment 100.

In the illustrative example of FIG. 1, one of the ARFNs 102 within the environment 100 is shown to project structured light 112. In addition, the ARFN 102 may capture one or more images 114 within the environment 100 for the purpose of identifying distortions in the structured light 112. While FIG. 1 illustrates one ARFN 102 projecting this structured light 112 and imaging the environment 100 to identify the distortions, in some implementations, one or more other ARFNs 102 may additionally or alternatively perform these functions. In either instance, by imaging the environment 100 in this manner, the ARFNs 102 may identify gestures of the user 108 within the environment 100. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects in a scene. For instance, the ARFN 102 may utilize time of flight (ToF) sensors or any other type of depth-sensing techniques to aid in identifying objects with the scene.

As illustrated, the computing device 104 of the example ARFN 102 includes one or more processors 116, an input/output interface 118, and memory or computer-readable media 120. The processors 116 may be configured to execute instructions, which may be stored in the computer-readable media 120 or in other computer-readable media accessible to the processors 116.

Figure 2:
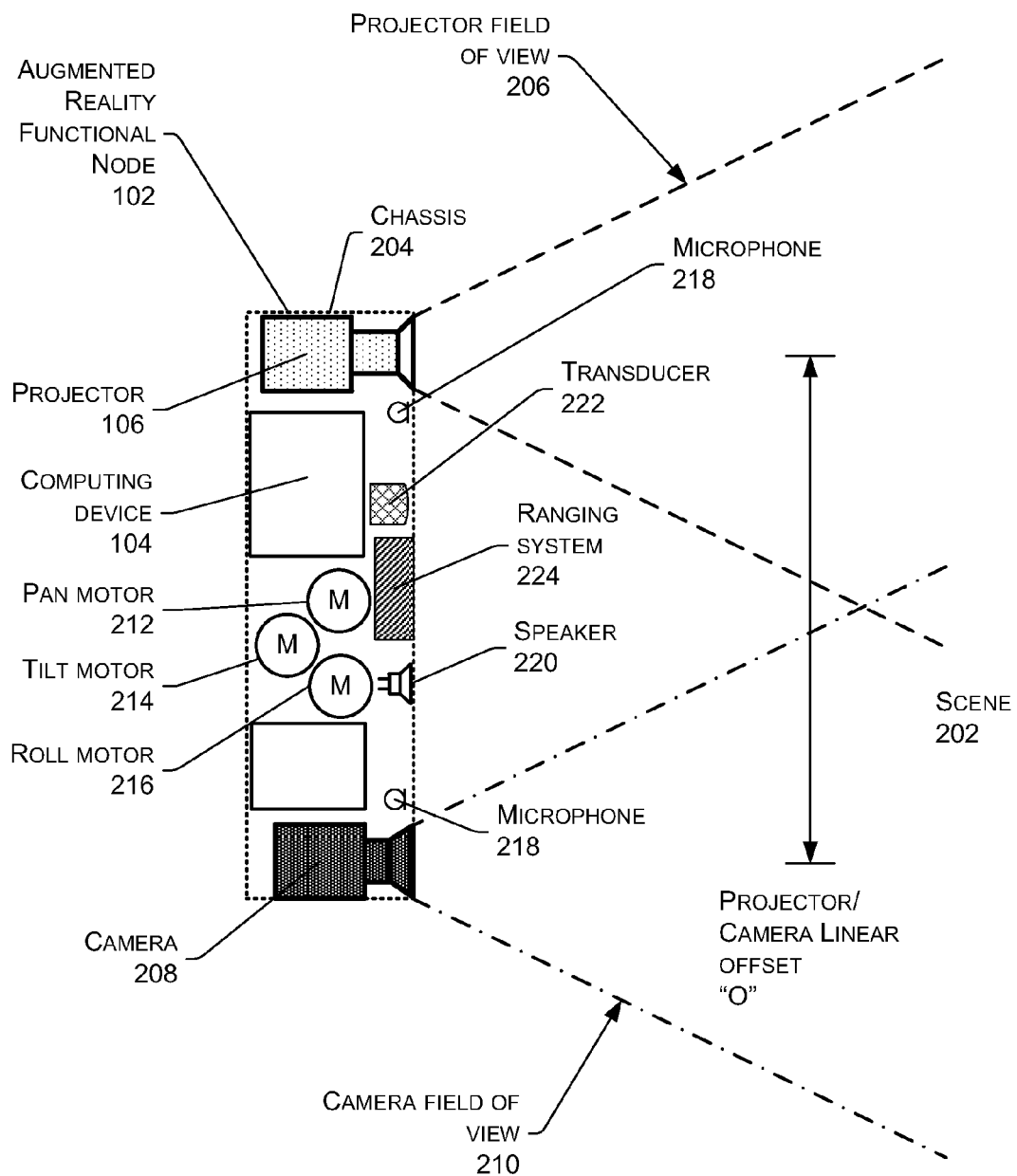
FIG. 2 illustrates an example ARFN that includes a computing device, a projector, a camera, and other selected components for allowing a user to interact with the ARFN with the use of gestures interpreted by the ARFN.

The input/output interface 118, meanwhile, may be configured to couple the computing device 104 to other components of the ARFN 102, such as the projector 106, the sensor 110, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensor 110, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 120, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 120 may reside within a housing of the ARFN 102, on one or more storage devices accessible on a local network, on cloud storage accessible via a wide area network, or in any other accessible location.

The computer-readable media 120 may store several modules, such as instructions, datastores, and so forth that are configured to execute on the processors 116. For instance, the computer-readable media 120 may store an operating system module 122, an interface module 124, a projection module 126, a content datastore 128, and a system parameters datastore 130.

The operating system module 122 may be configured to manage hardware and services within and coupled to the computing device 104 for the benefit of other modules. The interface module 124, meanwhile, may be configured to receive and interpret commands received from users within the environment 100. For instance, the interface module 124 may analyze and parse images captured by the sensor 110 to identify one or more hands in the environment 100. In response to recognizing a hand and identifying a gesture formed by the hand, the interface module 124 may interpret the gesture and cause the ARFN 102 to perform a corresponding action. For instance, if the user 108 within the environment 100 makes a gesture requesting that the ARFN 102 project a certain piece of content, the interface module 124 may interpret the gesture and cause the projection module 126 to project the content via the projector 106.

The interface module 124 may include a pointing finger detection module 132 that may be configured to detect a hand with a pointing finger in the environment 100. For example, the pointing finger detection module 132 may generate contours of objects in the environment 100 and determine whether any of the contours correspond to a hand with a pointing finger. In a particular implementation, the pointing finger detection module 132 may determine whether contours of surfaces in the environment 100 include a palm segment and a pointing finger segment. The pointing finger detection module 132 may determine whether a contour represents a palm segment by fitting a geometric shape, such as a circle, within the contour and determining whether values for one or more dimensions of the circle are included in a predetermined range of values. Additionally, the pointing finger detection module 132 may determine whether a contour includes a pointing finger segment by measuring a distance between the center of the circle associated with a palm segment and a characteristic point of the contour. When the distance is included in a predetermined range of distances, the pointing finger detection module 132 may determine that the contour represents a pointing finger segment. In situations where a contour includes both a palm segment and a pointing finger segment, the pointing finger detection module 132 may determine that the particular contour corresponds to a hand with a pointing finger.

In some cases, the interface module 124 may determine a location within the environment 100 of a hand with a pointing finger in relation to a user interface being projected into the environment 100. For example, the interface module 124 may determine that a pointing finger in the environment 100 is pointing to a particular portion of a user interface within the environment 100, such as a particular number on a telephone keypad. The interface module 124 may then interpret the pointing finger as indicating an input of a particular number to be included in a telephone number being dialed using the telephone user interface being projected into the environment 100.

The content datastore 128, meanwhile, stores content to be output within the environment 100. For instance, the content datastore 128 may store applications and data for use within the environment 100. The projection module 126 may access the content datastore 128 in order to project requested content within the environment 100. For instance, when a user requests that the ARFN 102 project a particular electronic book, the projection module 126 may access the content datastore 128 to retrieve and cause projection of the desired electronic book.

The computer-readable media 120 may also store the system parameters datastore 130, which is configured to maintain information about the state of the computing device 104, the projector 106, the sensor 110, and so forth. For example, and as described in detail below, the ARFN 102 may be configured to pan and tilt for the purpose of allowing the projector 106 and the sensor 110 to access different projection surfaces in the environment 100. As such, the system parameters maintained in the system parameters datastore 130 may include current pan and tilt settings of the projector 106 and the sensor 110, an indication of content that the ARFN 102 is currently projecting or otherwise outputting, and the like.

The system parameters datastore 130 (or another datastore) may further store a library of reference gestures that may be used to interpret user gestures. As illustrated, the user 108 in the environment 100 may make gestures with his body, such as hand motions, that can be captured by the sensors 110. The computing device 104 may identify motion parameters corresponding to the observed gesture and compare the observed motion parameters to those of the library of reference gestures. The computing device 104 may then classify the observed gesture based on the comparison.

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface, such as a display object, within the scene 202. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector 106. For example, the projector field of view 206 may narrow upon application of an optical zoom to the projector 106.

One or more cameras 208 may also be disposed within the chassis 204. The camera 208 is configured to image the scene 202 in visible light wavelengths, non-visible light wavelengths, or both. The camera 208 has a camera field of view 210 that describes a particular solid angle. The camera field of view 210 may vary according to changes in the configuration of the camera 208. For example, an optical zoom of the camera 208 may narrow the camera field of view 210.

In some implementations, a plurality of cameras 208 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color and/or texture within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 208. For example, in one implementation the actuator may comprise a pan motor 212, a tilt motor 214, a roll motor 216, and so forth. The pan motor 212 is configured to rotate the chassis 204 in a yawing motion. The tilt motor 214, meanwhile, is configured to change the pitch of the chassis 204. The roll motor 216 is configured to move the chassis 204 in a rolling motion. By panning, tilting, and/or rolling the chassis 204, different views of the scene 202 may be acquired.

One or more microphones 218 may be disposed within the chassis 204, or elsewhere within the scene 202. These microphones 218 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 218 and used to summon an active zone within the scene 202.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 is configured to provide distance information from the ARFN 102 to a scanned object or a set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

FIG. 2 also illustrates a projector/camera linear offset designated as "O". This is a linear distance between the projector 106 and the camera 208. Placement of the projector 106 and the camera 208 at a distance "O" from one another may aid in the recovery of 3D structured light data from the scene 202. The known projector/camera linear offset "O" may also be used to calculate distances, dimensioning, and otherwise aid in the characterization of objects within the scene 202. In other implementations the relative angle and size of the projector field of view 206 and camera field of view 210 may vary. Also, the angle of the projector 106 and the camera 208 relative to the chassis 204 may vary.

In other implementations, the components of the ARFN 102 may be distributed in one or more locations within the scene 202. As mentioned above, microphones 218 and speakers 220 may be distributed throughout the environment that includes the ARFN 102. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
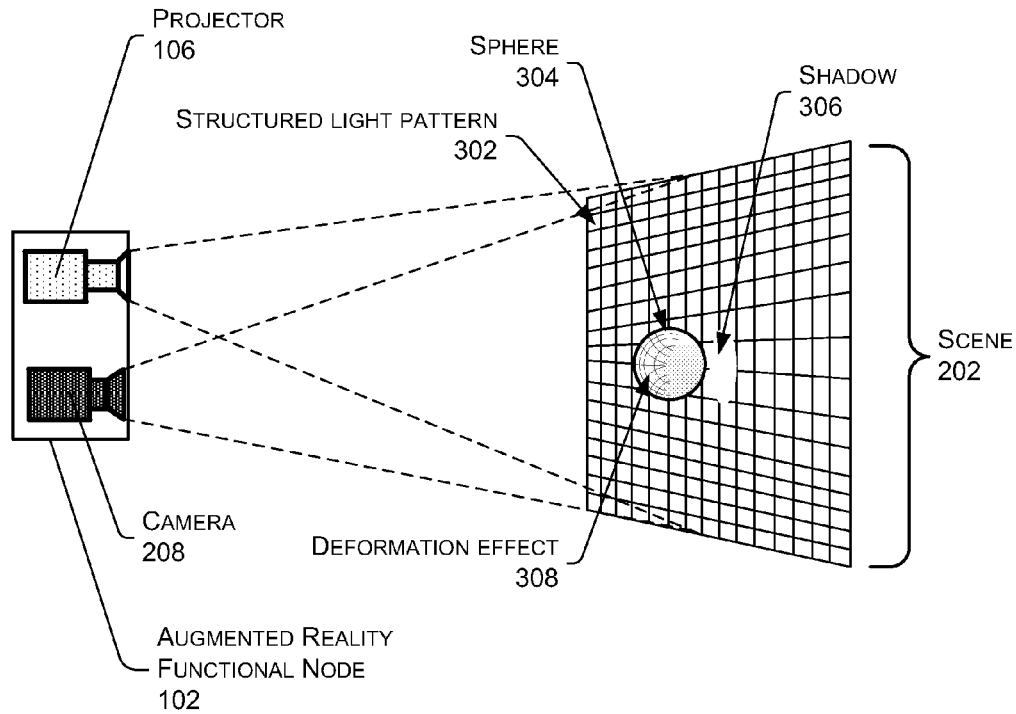
FIG. 3 is an illustrative diagram of the ARFN using structured light to identify surfaces, objects, and user interactions within an environment.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments, such as using ToF sensors or other depth-sensing techniques.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 208 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to a user within the scene 202, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene 202. These may include different PN patterns, geometric shapes, and so forth.

For illustrative purposes in FIG. 3, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene 202. Where the projector 106 and camera 208 have differing fields of view, such as shown in FIG. 2, the dispersion or change in the "density" of the structured light pattern 302 may be used to determine depth of field.

The camera 208 may detect the interaction of the structured light pattern 302 with objects within the scene 202. For example, the deformation effect 308 on the sphere 304 may be detected by the camera 208. The camera 208 may similarly identify deformation effects on users within the scene 202 and may utilize this information to identify user gestures and trajectories of these gestures. That is, the camera 208 may identify, via deformation in the structured light, a location of a selection tool (e.g., a user's finger) as this location changes over time. The ARFN 102 may then use these locations tracked over time to identify a trajectory of the gesture. The location of the selection tool may be expressed as 3D position coordinates specified relative to orthogonal X, Y, and Z axes, 3D angular orientations may be specified as rotations about the X, Y, and Z axes, or both.

Figure 4:
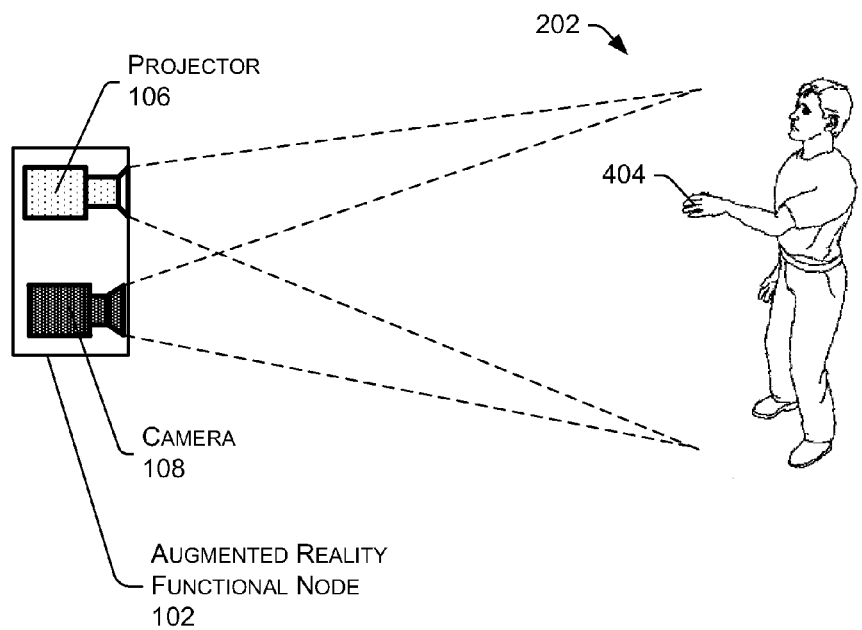
FIG. 4 is an illustrative diagram of the ARFN detecting the user's hand within an environment.

FIG. 4 illustrates an example of how the ARFN 102 may be used to observe and identify hand gestures within the scene 202. FIG. 4 shows a person 402 and the person's hand 404 as examples of objects within the environment 100 that may be analyzed by the ARFN 102.

In order to identify hand gestures, the ARFN 102 detects and tracks the hand 404 within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100. The captured 2D image may be a color or grayscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Described below are techniques of using a projection and imaging system (e.g., an ARFN 102) to detect a hand with a pointing finger. The various processes described below with reference to FIGS. 5 and 10 may be implemented by the architectures described herein, or by other architectures. Each process is illustrated as a collection of blocks in a logical flow graph. Some of the blocks represent operations that can be implemented in hardware, software, or a combination thereof. In an illustrative example, the operations may be implemented via one or more of the modules 122, 124, 126, and 132 of the ARFN 102 of FIG. 1. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
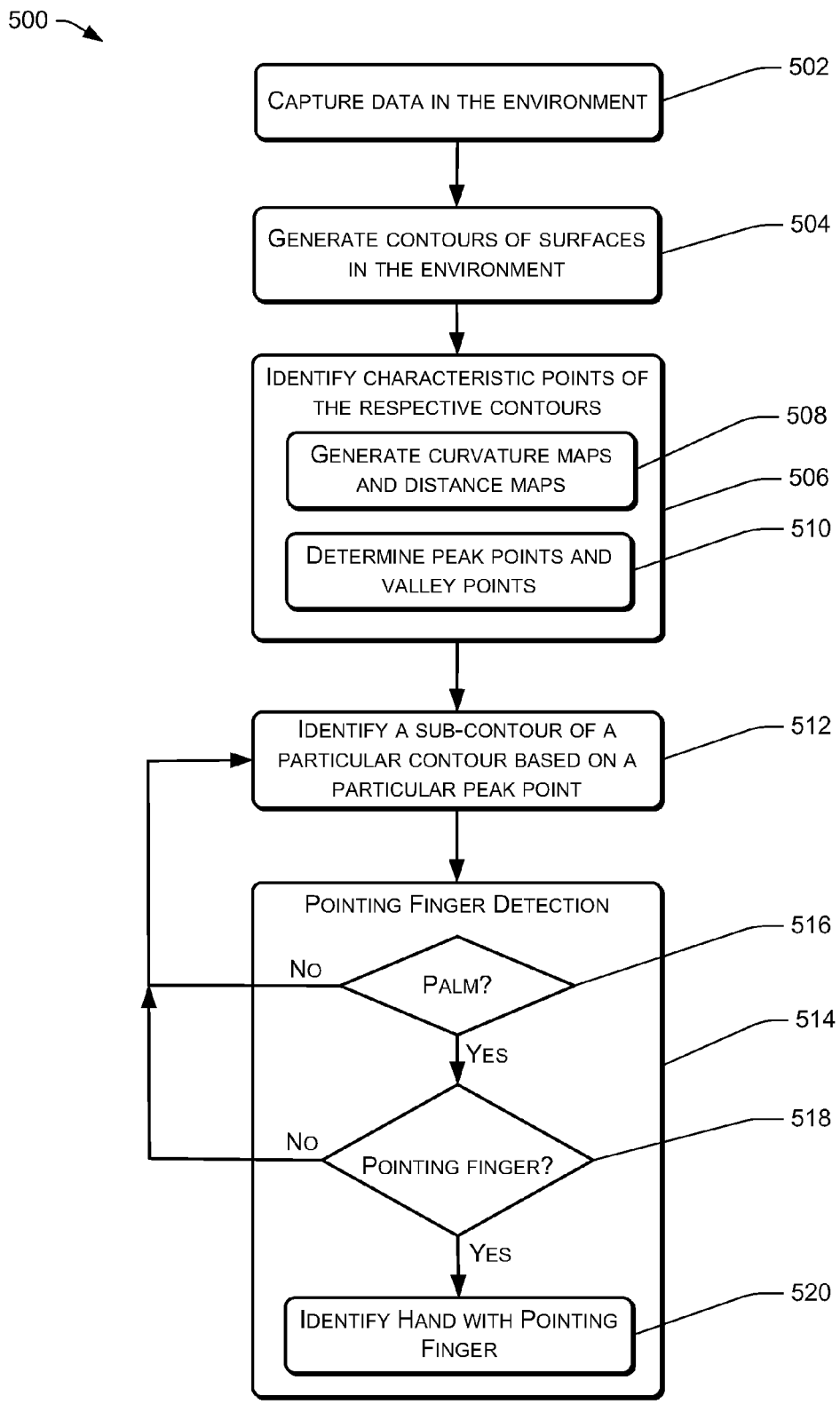
FIG. 5 illustrates an example flow diagram of a process to detect a hand with a pointing finger according to one implementation.

FIG. 5 illustrates an example flow diagram of a process 500 to detect a hand with a pointing finger according to one implementation. By detecting a hand with a pointing finger within an environment, input provided by a user in the environment can be identified. The process 500 will be described as being performed in the environment 100 described above with reference to FIGS. 1-4. However, the process 500 may be performed in other environments, using other means of image capture and/or scene analysis.

At 502, data is captured by one or more of the sensors 110 of the ARFNs 102. For example, a plurality of images of a scene 202 within the environment 100 may be obtained via the cameras 208. In one implementation, the images may include a series of images captured over time. In some cases, the plurality of images may include 2D images of the scene 202. In other cases, the plurality of images may include 3D images of the scene 202. In a particular implementation, depth information indicating a distance between portions of an object and the sensor 110 may be added to data from 2D images to generate 3D images. In one illustrative example, the depth information may be generated by a time-of-flight (ToF) sensor. Additionally, 3D information or characteristics may be obtained by detecting the interaction between the structured light pattern 302 and one or more objects within the scene 202, such as one or more hands of the user 108. Alternatively, or in addition, the captured images may include images of the scene 202 taken from different perspectives, which may be analyzed in comparison to each other to reconstruct 3D characteristics of the scene 202. Further, at least a portion of the plurality of images may include images captured by an RGB camera.

At 504, contours of objects in the environment 100 may be generated from data obtained from images of the environment 100. In a particular implementation, contours of objects in the environment 100 may be determined by segmenting surfaces within the environment 100 to identify different continuous surfaces of 3D images of the environment 100. In some instances, the segmentation of the 3D images of the environment 100 may produce 3D data sets corresponding to each respective continuous surface. In an illustrative implementation, continuous surfaces within the environment 100 may be identified by determining distances between particular points in the environment 100 and the sensor 110. When the difference between respective distances between two points within the environment 100 and the sensor 110 is less than or equal to a threshold distance, the two points are designated as being part of the same continuous surface.

In a particular implementation, 3D boundaries of the continuous surfaces may then be determined. The 3D boundaries of the continuous surfaces may include 3D points located on the outermost edges or the periphery of the continuous surfaces in the environment 100. Subsequently, 2-dimensional (2D) contours of the continuous surfaces may be generated from the 3D boundaries by translating respective portions of the 3D boundaries into corresponding 2D points according to a specified function. In some cases, a function may be applied to the contours generated for an image to decrease any noise associated with the contour and to smooth the contours. In an illustrative implementation, a 2D Gaussian kernel may be applied to the contours to perform a smoothing operation.

At 506, the process 500 includes identifying characteristic points of respective contours. Determining characteristic points of respective contours includes, at 508, generating curvature maps and distance maps for respective contours generated from images of the environment 100. Curvature maps and distance maps are produced from various contours segmented from the scene 202, some of which are potential-hand contours. In one implementation, this action 508 involves two sub-processes including tracing the periphery of the contour of the hand segment to produce a curvature map and mapping distances between points on the contour of the hand to a distance map. The generation of an example curvature map and an example distance map are described below with reference to FIG. 6.

At 510, contour characteristic points of the potential-hand contour are identified in part by using the curvature and distance maps. In some cases, the characteristic points may include peak points, while in other situations the characteristic points may include valley points. The peak points may correspond to finger tips and/or knuckles of a hand contour, and the valley points may correspond to indentations at or near the joints between neighboring fingers.

Computing peak points may include identifying convex hulls of respective contours. Additionally, the peak points may be identified when the curvature of a convex hull is at a local maximum on the curvature map for the contour (i.e., signifying a change in direction at the finger tip) and distance is at a local minimum on the distance map of the contour (i.e., signifying that points at a fingertip are close together). A valley point is found where curvature is at a local minimum on the curvature map (i.e., signifying a change in direction at the place between fingers) and distance is also at a local minimum of the distance map (i.e., signifying that points between fingers are close together).

At 512, the process 500 includes identifying sub-contours in the environment 100 based, at least in part, on peak points of the contours. The sub-contours may represent a portion of a larger contour included in the environment 100. In a particular implementation, a sub-contour may be identified by defining a circle in the environment 100 using a peak point of a particular contour as the center of the circle, where the circle has a predetermined radius. In one example, the radius of the circle may be based on an average human hand size or a median human hand size. In an illustrative embodiment, the radius of the circle may be expressed in a number of measurements, such as millimeters, centimeters, inches, and the like. In some cases, the circle may include a single sub-contour, while in other scenarios the circle may include multiple sub-contours. Generating a circle with a peak point of a contour at the center is described in more detail with respect to FIG. 7. In any case, a particular sub-contour within the circle is extracted and the process 500 moves to 514 to determine whether the sub-contour includes a hand with a pointing finger.

Determining whether a particular sub-contour includes a hand with a pointing finger may include decision 516 to determine whether the particular sub-contour includes a palm segment. Determining whether the particular sub-contour includes a palm segment may include fitting a geometric shape within the particular sub-contour. The geometric shape may include a circle, an ellipse, a triangle, a square, a rectangle, or a polygon. In an embodiment, fitting a geometric shape within the particular sub-contour may include calculations to identify a geometric shape that fits within the particular sub-contour and that satisfies one or more criteria. For example, the ARFN 102 may identify a geometric region within the particular sub-contour that has at least a specified value for a dimension of the geometric region. To illustrate, the ARFN 102 may identify a circle having a maximum diameter that fits within the particular sub-contour. Additionally, the ARFN 102 may identify a geometric shape that has boundaries that contact a specified amount of the particular sub-contour. In some cases, the geometric shape may include a circle inscribed within the particular sub-contour, such that the particular sub-contour is fitted with the largest possible circle that contacts as many sides of the particular sub-contour as possible at right angles. In a particular embodiment, fitting a geometric shape within the particular sub-contour may be an iterative process. In one example, the ARFN 102 may define a number of circles within the particular sub-contour and identify the particular circle of the number of circles that satisfies the specified criteria, such as a particular circle having a diameter with the greatest value with respect to the diameters of the other circles and that contacts the greatest amount of the particular sub-contour with respect to the other circles. An example of fitting a circle within a particular contour is described in more detail with respect to FIG. 8.

Determining whether a particular sub-contour includes a palm segment may also include measuring a dimension of the fitted geometric shape and determining whether the dimension has a value included in a predetermined range. For example, a radius of a fitted circle, a diameter of a fitted circle, a circumference of a fitted circle, or a combination thereof, may be measured. In some cases, the dimension of the fitted circle may be expressed in a number of pixels. In other cases, the fitted circle may be translated into a 3D sphere using depth information obtained from the sensors 110 of the ARFNs 102. In these situations, the dimension may be expressed as a physical distance in a particular unit of measurement, such as millimeters, centimeters, or inches. In a particular implementation, the predetermined values for the dimension may correspond to an average radius of a human palm, an average diameter of a human palm, a median radius of a human palm, or a median diameter of a human palm. When a geometric shape fitted within a particular contour includes a dimension with a value that is included in a predetermined range of values, the process 500 may proceed to 518. Otherwise, the process 500 returns to 512 to identify another sub-contour to evaluate for a hand with a pointing finger.

At 518, the process 500 includes determining whether the particular sub-contour includes a pointing finger segment. In an implementation, a pointing finger segment may be identified by measuring a distance between the peak point used to generate the first circle used to identify the particular sub-contour and a point of the fitted geometric shape, such as the center of the fitted geometric shape. For example, the fitted geometric shape may include a second circle and a distance between the center of the second circle and the peak point used to generate the first circle may be measured. When the distance is within a predetermined range, the particular sub-contour may be designated as including a pointing finger segment. In some cases, the predetermined range for the distance between the peak point used to generate the first circle used to identify the particular sub-contour and the center of the fitted geometric shape may be based on the average distance or the median distance between a tip of a finger and the center of the palm of a human hand. The predetermined range may also be based on a length of an extended finger, such as the length of an extended index finger. In situations where a particular sub-contour includes both a palm segment and a pointing finger segment, the process 500 may move to 520, where the particular sub-contour is identified as a hand with a pointing finger. Otherwise, the process 500 returns to 512 to identify another sub-contour to evaluate for a hand with a pointing finger.

Thus, in an illustrative implementation, the process 500 may be used to identify characteristic points of contours of surfaces in an environment and iteratively evaluate contours associated with the characteristic points to determine whether a particular contour includes both a palm segment and a pointing finger segment. The process 500 also reduces an amount of each contour to be evaluated by identifying sub-contours within a circle generated using the peak points of the contours and the average size of a human hand. Consequently, in some cases, multiple contours may be evaluated before identifying a particular contour that includes a palm segment and a pointing finger segment. Additionally, multiple peak points of a contour may be utilized to identify different respective sub-contours before identifying a particular sub-contour that corresponds to a hand with a pointing finger.

Figure 6:
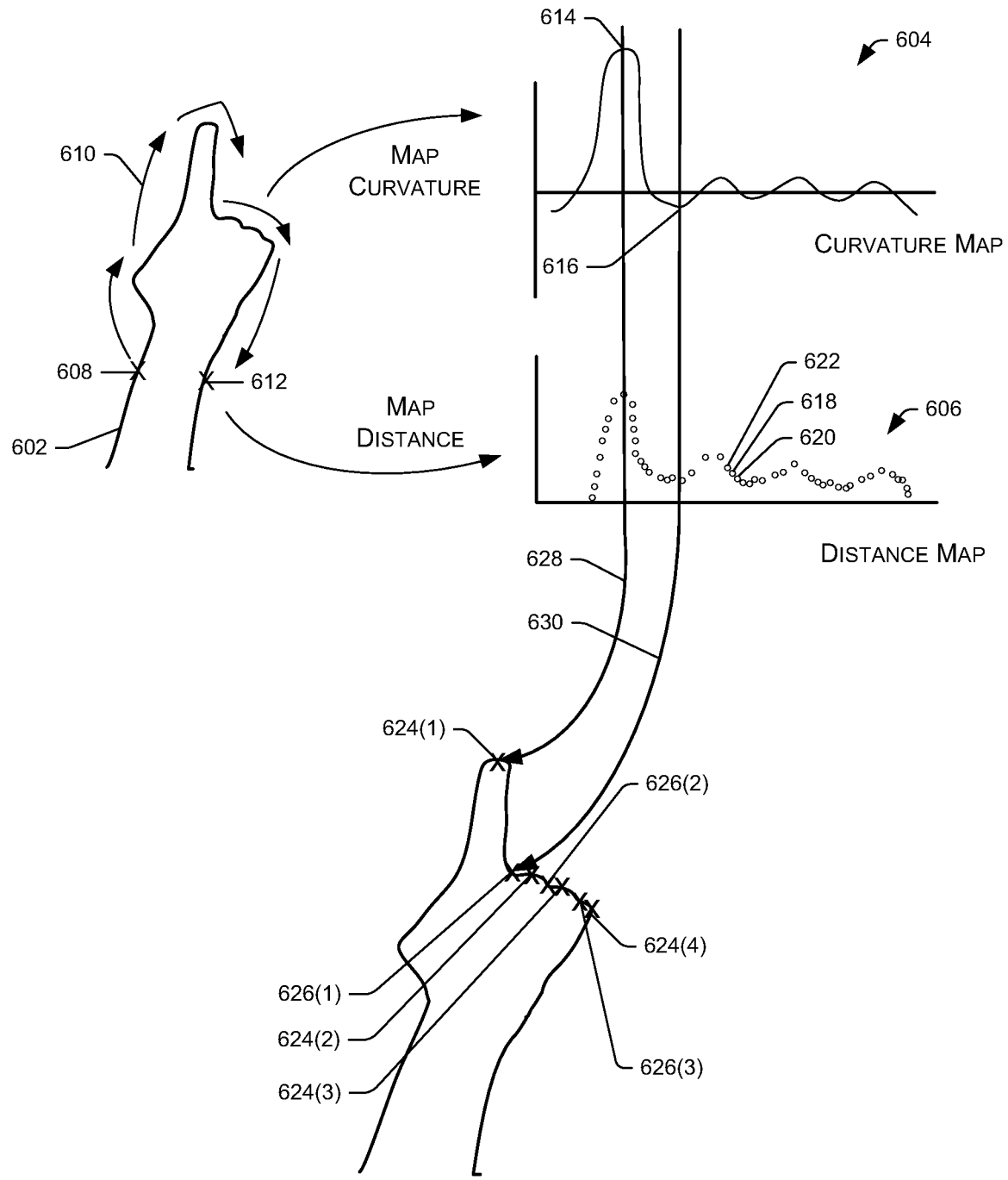
FIG. 6 illustrates a curvature map and a distance map generated from contours of an object according to one implementation.

FIG. 6 illustrates a curvature map and a distance map generated from contours of an object according to one implementation. As shown in FIG. 6, a particular sub-contour 602 is used to generate a curvature map 604 and a distance map 606. In this illustration, the sub-contour 602 includes a hand with a pointing index finger with the remaining digits folded in towards the palm. The curvature map 604 is formed by mapping the curvature of the sub-contour 602 in terms of a first predefined translation function associated with the curvature. The outer periphery line of the sub-contour 602 may be traced beginning at a point 608 at the base of the palm, around the pointing finger and the folded digits (as represented by the arrows 610), and terminating at a point 612 at the base of the palm on the opposite side.

The first translation function may be essentially any rule that graphically captures curvature of the hand segmented from a 2D image. For example, one function may be to express the contour in terms of direction changes along the hand where leftward movement is positive on the curvature map 604 and rightward movement is negative. Another example function may be to express in terms of vertical direction so that upper movement is positive on the curvature map 604 and downward movement is negative. Essentially any translation function may be used.

The curvature map 604 shows convex portions of the sub-contour 602 as having the greatest amount of curvature. Thus, the portions of the curvature map 604 corresponding to the tip of the pointing finger and the knuckles of the hand indicate the greatest amounts of curvature. Additionally, local maximum values of the curvature of the sub-contour 602 may be determined by identifying points on the curvature map 604 corresponding to a maximum curvature value for respective portions of the sub-contour 602, such as respective convex portions of the sub-contour 602. For example, a local maximum 614 of the curvature map 604 is associated with the portion of the sub-contour 602 corresponding to the tip of the index finger of the hand. Further, local minimum values of the curvature of the sub-contour 602 may be determined by identifying points on the curvature map 604 corresponding to a minimum curvature value for respective concave portions of the sub-contour 602. To illustrate, a local minimum 616 of the curvature map 604 is associated with the portion of the sub-contour 604 corresponding to the valley between the index finger and the middle finger of the hand.

The distance map 606 is formed as a function of distance along the curvature of the sub-contour 602. One approach to plotting the distance is to express the points 618 in the distance map 606 as an absolute value of the distance between adjacent points along the sub-contour 602. Adjacent points along the sub-contour 602 may be defined as a particular point 618 on the distance map 606 that is encountered when tracing the sub-contour 602 from the point 608 to the point 612 and the next point 620 on the distance map 606 that is encountered when tracing the sub-contour 602 from the point 608 to the point 612. In another example, adjacent points along the sub-contour 602 may be defined as the particular point 618 on the distance map 606 that is encountered when tracing the sub-contour 602 from the point 608 to the point 612 and the previous point 622 on the distance map 606. In an embodiment, the points of the distance map 606 may be generated using a second translation function from 2D coordinates of the sub-contour 602. In some instances, the points of the distance map 606 may be closer together along areas having greater amounts of curvature due to an increase in the changes of direction along the contour at these regions. Accordingly, the distances between points along the lengths of the pointing finger tends to be greater in comparison to the distances between points along the fingertip, knuckles and valleys. Said another way, points on transitions between positive and negative portions of the curvature map tend to be closer together than points between the positive and negative transitions.

The curvature map 604 and the distance map 606 are used together to identify contour characteristic points of the hand, per act 510 of FIG. 5. As shown in FIG. 6, the two plots are used to identify peak points and valley points on the sub-contour 602. In the illustrative example of FIG. 6, the sub-contour includes a number of peak points 624(1)-624(4) and a number of valley points 626(1)-626(3). As illustrated by a reference line 628, a peak point at or near the tip of a finger, such as peak point 624(1), is computed as a point where the curvature is at a local maximum on the curvature map 604 (i.e., signifying a change in direction at the finger tip) and the distance is at a local minimum on the distance map 606 (i.e., signifying that points at a fingertip are close together).

As illustrated by a reference line 628, a valley point at or near the joint between neighboring fingers, such as valley point 626(1), is computed as a point where the curvature is at a local minimum on the curvature map (i.e., signifying a change in direction at the place between fingers) and distance is also at a local minimum on the distance map (i.e., signifying that points between fingers are close together).

Figure 7:
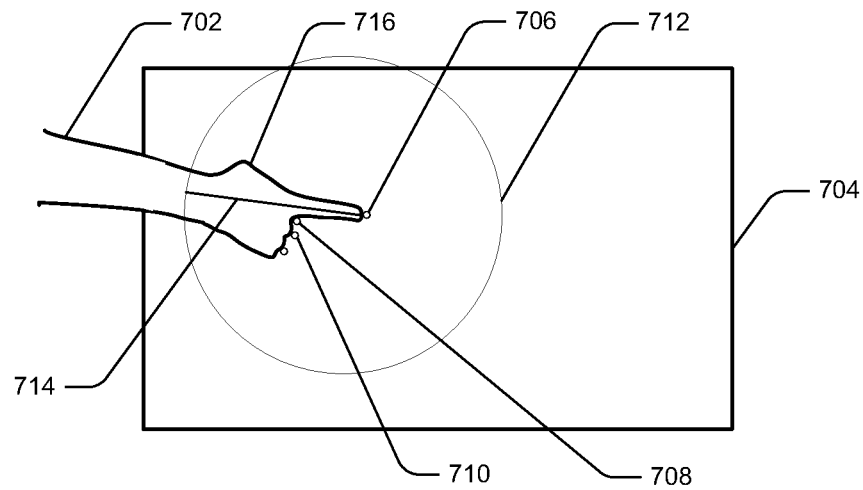
FIG. 7 illustrates contours of objects in an environment and a first circle to identify a sub-contour in the environment.

FIG. 7 illustrates contours of objects in an environment and a first circle to identify a sub-contour in the environment. The illustrative example of FIG. 7 includes a first contour 702 and a second contour 704. The first contour 702 includes a portion of an arm having a hand with a pointing finger and the second contour 704 includes a table located beneath the arm. The first contour 702 includes a number of characteristic points, such as a first peak point 706, a first valley point 708, and a second peak point 710. Either the first peak point 706 or the second peak point 710 may be used to generate a circular region used to identify a sub-contour of the first contour 702. In the illustrative example of FIG. 7, the first peak point 706 is designated as the center of a first circle 712. The first circle 712 includes a radius 714. The radius 714 may be based on a size of an average human hand. In some cases, the size of the average human hand may correspond to the average size of an adult human hand. The first circle 712 may be used to identify a sub-contour 716 that includes a portion of the first contour 702.

Figure 8:
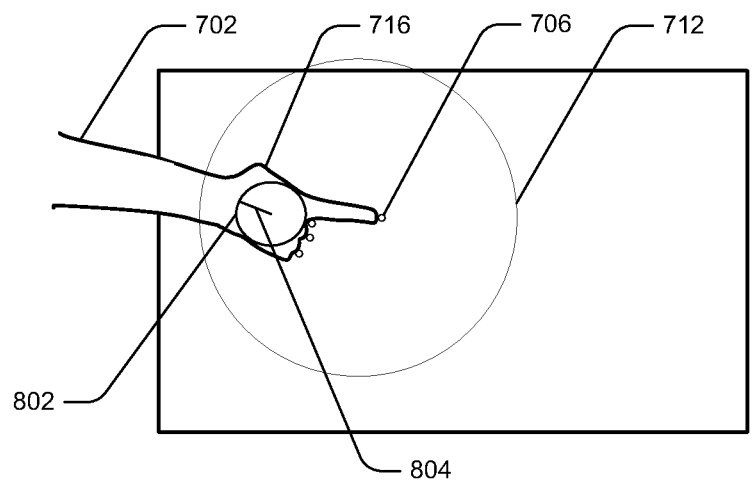
FIG. 8 illustrates contours of objects in the environment and a second circle fitted within the sub-contour to identify a palm segment.

FIG. 8 illustrates contours of objects in the environment and a second circle fitted within the sub-contour to identify a palm segment. The illustrative example of FIG. 8 includes the first contour 702 and the first peak point 706 from FIG. 7. The first peak point 706 serves as the center of the first circle 712. The first circle 712 identifies the sub-contour 716. To determine whether the sub-contour 716 includes a palm segment, a second circular region is defined within the first circle 712. In the illustrative example of FIG. 8, a second circle 802 is fitted within the sub-contour 716. In a particular implementation, the second circle 802 may be inscribed within the sub-contour 802. The second circle 802 may include a radius 804. In an embodiment, the second circle 802 may have a maximum value of the radius 804 and contact a maximum amount of the sub-contour 716. The value of the radius 804 may be used to determine whether the sub-contour 716 includes a palm segment. For example, the value of the radius 804 may be compared with a predetermined range of values. In some cases, the predetermined range of values may be based on an average size of a human palm. In particular situations, the predetermined range of values may include the average palm size as a center point of the predetermined range with the lower threshold and upper threshold of the predetermined range being within 50% of the center point, within 40% of the center point, within 25% of the center point, within 10% of the center point, or within 5% of the center point. When the radius 804 is within the predetermined range of values, the second circle 802 may be identified as a palm segment of a hand.

Figure 9:
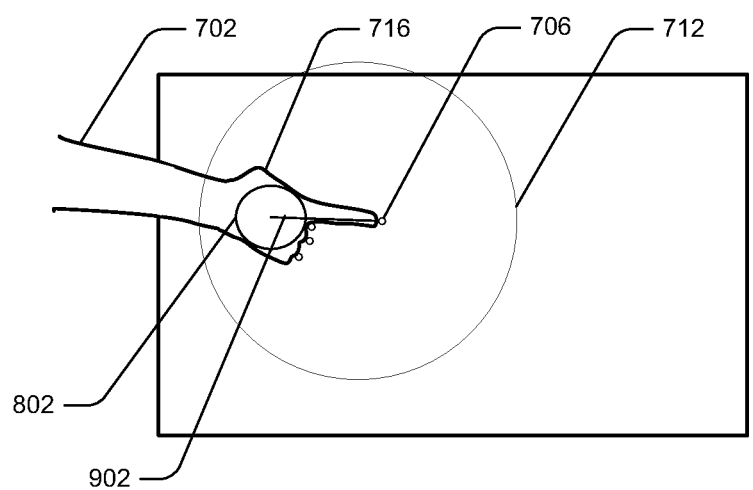
FIG. 9 illustrates contours of objects in the environment and a distance between the center of the second circle and a center of the first circle to identify a pointing finger segment.

FIG. 9 illustrates contours of objects in the environment and a distance between the center of the second circle and a peak point of the first circle to identify a pointing finger segment. The illustrative example of FIG. 9 includes the first contour 702 and the first peak point 706, which is the center of the first circle 712. The first circle 712 includes the sub-contour 716 and the second circle 802 has been fitted within the sub-contour 716. The illustrative example of FIG. 9 also includes a distance 902 between a center of the second circle 802 and the first peak point 706.

To determine whether the sub-contour 716 includes a pointing finger segment, the distance 902 may be compared with a predetermined range of distances. The range of distances may include an average distance from the tip of an extended finger to the center of the palm of an average human hand. In some cases, the range of distances may be based on the distance between the tip of an extended index finger and the center of the palm of an average human hand, while in other situations, the range of distances may be based on the distance between the tip of one or more extended fingers to the center of the palm of the average human hand. In a particular implementation, the average distance between the tip of an extended index finger and the center of the palm of an average sized human hand may be the center of the predetermined range with the upper threshold and the lower threshold of the predetermined range being within 50% of the center point, within 40% of the center point, within 25% of the center point, within 10% of the center point, or within 5% of the center point. When the distance 902 is included in the predetermined range, the sub-contour 716 may be identified as including a pointing finger segment. When the sub-contour 716 includes both a palm segment and a pointing finger segment, the sub-contour 716 may be designated as a hand with a pointing finger.

Figure 10:
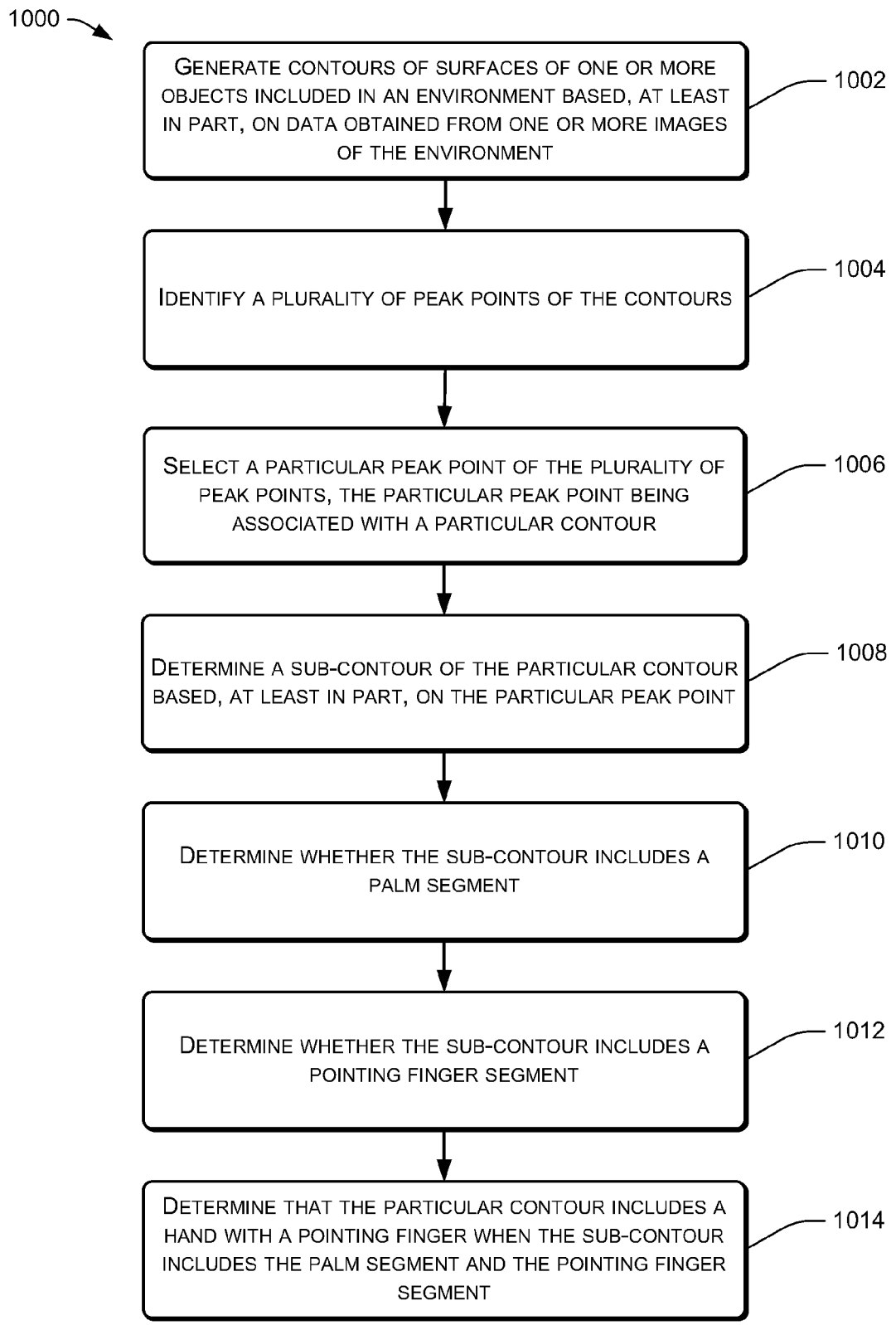
FIG. 10 shows an example flow diagram of a process to detect a hand with a pointing finger according to another implementation.

FIG. 10 shows an example flow diagram of a process 1000 to detect a hand with a pointing finger according to another implementation. At 1002, the process 1000 includes generating contours of surfaces of the one or more objects based, at least in part, on data obtained from one or more images of the plurality of images. The contours may be generated by segmenting surfaces in the environment to identify continuous surfaces in the environment. Additionally, the contours may be generated by determining 3-Dimensional (3D) points located on respective peripheries of the continuous surfaces.

At 1004, the process 100 includes identifying a plurality of peak points of the contours. The peak points may indicate a portion of a respective contour where the curvature of the respective contour is at a local maximum and the distance between adjacent points of the respective contour is at a local minimum. In some cases, valley points of the contour may also be identified. The valley points may indicate a portion of a respective contour where the curvature is at a local minimum and the distance between adjacent points of the respective contour is also at a local minimum. In a particular implementation, the peak points of the contours may be identified by generating respective curvature maps for the contours according to a first function that expresses the contours in terms of changes in direction along the contours and generating respective distance maps for the contours according to a second function that expresses an absolute value of a distance between respective points along the contours.

At 1006, the process 1000 includes selecting a particular peak point of the plurality of peak points, where the particular peak point is associated with a particular contour. At 1008, the process 1000 includes determining a sub-contour of the particular contour based, at least in part, on the particular peak point. In some cases, determining the sub-contour may include generating a circle with the particular peak point as a center point of the circle and identifying a portion of the particular contour included in the circle as the sub-contour. In a particular implementation, a diameter of the circle may be based, at least in part, on at least one of an average size of an adult human hand or a median size of an adult human hand At 1010, the process 1000 includes determining whether the sub-contour includes a palm segment. In some instances, determining whether the sub-contour includes a palm segment may include fitting a geometric shape within the sub-contour and determining whether a dimension of the geometric shape is included in a predetermined range of values for the dimension. In an implementation, the geometric shape may be a circle inscribed within the sub-contour.

Additionally, at 1012, the process 1000 includes determining whether the sub-contour includes a pointing finger segment. In an implementation, determining whether the sub-contour includes a pointing finger segment may include determining a distance between the particular peak point and a point of the geometric shape and determining whether the distance is included in a predetermined range of values for the distance. In some scenarios, the predetermined range of values for the distance may be based, at least in part, on a distance between a tip of an extended index finger and a center of a palm of an average adult human hand.

At 1014, the process 1000 includes determining that the particular contour includes a hand with a pointing finger when the sub-contour includes the palm segment and the pointing finger segment. In an implementation, the hand with the pointing finger may be used to determine an input indicated by a user in the environment. For example, a user interface may be projected into the environment and the user may indicate an input via the user interface by pointing an index finger at a particular location of the user interface. By determining a location of the pointing finger with respect to the user interface, the input indicated by the pointing finger may be identified and processed accordingly.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more cameras to obtain one or more images of an environment, the environment including one or more objects;
   one or more computer-readable media storing computer-executable instructions that, when executed by the one or more processors, cause the one or more processors to perform acts comprising:
      determining a contour of a surface of an object of the one or more objects based, at least in part, on data obtained from the one or more images;
      generating a curvature map for the contour according to a first function that expresses the contour in terms of changes in direction along the contour;
      generating a distance map for the contour according to a second function that expresses an absolute value of a distance between respective points along the contour;
      identifying a plurality of peak points of the contour based at least in part on the curvature map and the distance map, each of the plurality of peak points indicating a portion of the contour where curvature of the contour is at a local maximum and distance between adjacent points of the contour is at a local minimum;
      selecting a peak point of the plurality of peak points, the peak point being associated with the contour;
      determining a sub-contour of the contour by identifying a portion of the contour that includes the peak point;
      determining that the sub-contour includes a palm segment;
      determining that the sub-contour includes a pointing finger segment; and
      determining that the particular contour includes a hand with a pointing finger at least partly in response to determining that the sub-contour includes the palm segment and the pointing finger segment.

2. The system of claim 1, wherein determining the sub-contour of the contour by identifying a portion of the sub-contour that includes the peak point includes:
   defining a first circular region in the environment, wherein the peak point is a center of the first circular region and the diameter of the first circular region is based, at least in part, on at least one of an average size of an adult human hand or a median size of an adult human hand, wherein the sub-contour includes the portion of the contour included in the first circular region.

3. The system of claim 2, wherein determining that the sub-contour includes the palm segment includes:
   defining one or more second circular regions within the sub-contour;
   identifying a particular second circular region of the one or more circular regions within the sub-contour that satisfies one or more criteria; and
   determining that the sub-contour includes the palm segment when a radius of the particular second circular is included in a predetermined range of values for the radius.

4. The system of claim 3, wherein determining that the sub-contour includes the pointing finger segment includes:
   determining a distance between the peak point and a center of the particular second circular region; and
   determining that the sub-contour includes the pointing finger segment when the distance between the peak point and the center of the particular second circular region is included in a predetermined range of values for the distance.

5. A method comprising:
   obtaining, by one or more sensors of a computing device, one or more images of an environment;
   determining a contour of a surface in the environment based, at least in part, on the one or more images;
   determining that the contour represents a palm segment and a pointing finger segment based, at least in part, on an absolute value of one or more distances between respective points along the contour, wherein determining that the contour represents a palm segment and a pointing finger segment includes:
   identifying a peak point of the contour;
   identifying a sub-contour of the contour within a region defined, at least in part, by the peak point;
   defining a geometric shape within the sub-contour, wherein the geometric shape has features that satisfy a first criteria;
   determining that the sub-contour includes the palm segment when a dimension of the geometric shape satisfies a second criteria;
   determining a distance between the peak point and a point of the geometric shape; and
   determining that the sub-contour includes the pointing finger segment when the distance satisfies an additional criteria, wherein the additional criteria includes the distance being within a predetermined range of values for a distance between a tip of an extended index finger and a center of a palm of an average or median adult human hand; and
   determining that the contour represents a hand with a pointing finger based, at least in part, on the contour representing the palm segment and the pointing finger segment.

6. The method of claim 5, wherein the first criteria includes the geometric shape having boundaries that contact a maximum amount of the sub-contour, the geometric shape having a maximum dimension, or both.

7. The method of claim 5, wherein the geometric shape is a circular region defined within the sub-contour.

8. The method of claim 5, further comprising:
   displaying a user interface into the environment;
   determining a location of the pointing finger with respect to the user interface; and determining an input indicated by the pointing finger based, at least in part, on the location of the pointing finger with respect to the user interface.

9. One or more non-transitory computer-readable media storing computer-executable instructions that, when executed by one or more processors, cause the one or more processors to perform acts comprising:
- selecting a first contour of a plurality of contours determined from one or more images of an environment;
- determining that the first contour does not represent a hand with a pointing finger;
- selecting a second contour of the plurality of contours;
- generating a curvature map comprising 1-dimensional (1D) curvature information contour according to a first function that expresses the second contour in terms of changes in direction along the second contour;
- generating a distance map comprising 1D distance information according to a second function that expresses an absolute value of a distance between respective points along the second contour;
- identifying a palm segment and a pointing finger segment within a portion of the second contour based at least in part on the absolute value of the distance; and
- determining that the second contour represents the hand with the pointing finger.

10. The one or more non-transitory computer-readable media of claim 9, wherein each of the plurality of contours are determined from 3-dimensional (3D) information obtained from the one or more images.

11. The one or more non-transitory computer-readable media of claim 10, wherein each of the plurality of contours from 3D information obtained from the one or more images are determined by:
- segmenting surfaces in the environment to identify a plurality of continuous surfaces in the environment;
- determining boundaries of each of the plurality of continuous surfaces;
- determining the first contour by translating first 3D information of a first continuous surface to first 2-dimensional (2D) information according to a function; and
- determining the second contour by translating second 3D information of a second continuous surface to second 2D information according to the function.

12. The one or more non-transitory computer-readable media of claim 9, wherein the palm segment and the pointing finger segment are identified using the 1-dimensional (1D) curvature information and the 1D distance information obtained from the second contour.

13. The one or more non-transitory computer-readable media of claim 12, wherein the acts further comprise:
- identifying peak points of the second contour based, at least in part, on the 1D curvature information, wherein the peak points are defined as regions on the second contour corresponding to portions of the curvature map that have a local maximum; and
- identifying the palm segment and the pointing finger segment within the portion of the second contour based, at least in part, on at least one of the peak points.

14. The one or more non-transitory computer-readable media of claim 9, wherein determining whether the first contour represents a hand with a pointing finger includes:
- identifying a peak point of the first contour;
- identifying a sub-contour of the first contour within a region defined, at least in part, by the peak point of the first contour;
- defining a shape within the sub-contour of the first contour based, at least in part, on one or more criteria; and
- determining that the first contour does not represent the hand with the pointing finger based, at least in part, on the shape defined within the sub-contour of the first contour including a dimension having a value outside of a predetermined range of values for the dimension.

15. The one or more non-transitory computer-readable media of claim 9, wherein determining whether the first contour represents a hand with a pointing finger includes:
- identifying a peak point of the first contour;
- identifying a sub-contour of the first contour within a region defined, at least in part, by the peak point of the first contour;
- defining a shape within the sub-contour of the first contour based, at least in part, on one or more criteria; and
- determining that the first contour does not represent the hand with the pointing finger based, at least in part, on a distance from the peak point to a center of the shape being outside of a predetermined range of distances.

* * * * *